US010237540B2

(12) United States Patent
Welch et al.

(10) Patent No.: US 10,237,540 B2
(45) Date of Patent: Mar. 19, 2019

(54) LIGHT PROJECTOR USING AN ACOUSTO-OPTICAL CONTROL DEVICE

(71) Applicant: MAGIC LEAP, INC., Plantation, FL (US)

(72) Inventors: Hudson Welch, Fort Lauderdale, FL (US); Jeremy A. Grata, Coral Springs, FL (US); Marwan Hussein, San Jose, CA (US)

(73) Assignee: MAGIC LEAP, INC., Plantation, FL (US)

(*) Notice: Subject to any disclaimer, the term of this patent is extended or adjusted under 35 U.S.C. 154(b) by 0 days.

(21) Appl. No.: 15/985,264

(22) Filed: May 21, 2018

(65) Prior Publication Data
US 2018/0270477 A1 Sep. 20, 2018

Related U.S. Application Data

(63) Continuation of application No. 14/983,388, filed on Dec. 29, 2015, now Pat. No. 10,015,477.

(60) Provisional application No. 62/097,563, filed on Dec. 29, 2014.

(51) Int. Cl.
H04N 9/14 (2006.01)
H04N 13/344 (2018.01)
G02F 1/33 (2006.01)
G06T 19/00 (2011.01)
G02B 5/32 (2006.01)

(52) U.S. Cl.
CPC ............ *H04N 13/344* (2018.05); *G02B 5/32* (2013.01); *G02F 1/33* (2013.01); *G06T 19/006* (2013.01); *H04N 9/14* (2013.01); *H04N 2213/001* (2013.01); *H04N 2213/002* (2013.01); *H04N 2213/008* (2013.01)

(58) Field of Classification Search
CPC .. H04N 13/044; H04N 9/14; H04N 2213/001; H04N 2213/002; H04N 2213/003; G02B 5/32; G02F 1/33; G06T 19/006
USPC .......................................................... 348/53
See application file for complete search history.

(56) References Cited

U.S. PATENT DOCUMENTS

| 3,851,951 | A | 12/1974 | Eveleth |
| 5,903,397 | A | 5/1999 | Melville et al. |
| 2002/0113753 | A1 | 8/2002 | Sullivan et al. |
| 2002/0135673 | A1 | 9/2002 | Favalora et al. |
| 2009/0040294 | A1 | 2/2009 | Smalley et al. |
| 2009/0316116 | A1 | 12/2009 | Melville et al. |
| 2013/0050788 | A1 | 2/2013 | Maeng et al. |
| 2015/0205126 | A1 | 7/2015 | Schowengerdt |

FOREIGN PATENT DOCUMENTS

WO 2013/163347 A1 10/2013

OTHER PUBLICATIONS

Qaderi, Kamran, et al., "Leaky-mode waveguide modulators with high deflection angle for use in holographic video displays", Optics Express, vol. 24, No. 18, Sep. 5, 2016, 11 pages.

*Primary Examiner* — Nguyen T Truong
(74) *Attorney, Agent, or Firm* — Jeffrey S. Sommers

(57) ABSTRACT

An approach for projecting light may be implemented using a acousto-optical depth switch that uses surface acoustic waves produced along a substrate to guide image light to different areas. The surface acoustic waves may be generated on a substrate using a transducer. Surface acoustic waves of different frequencies can guide image light onto different optical elements at different physical positions. The optical elements may be configured to show objects in an image at different distances from a viewer.

12 Claims, 19 Drawing Sheets

LIGHT PROJECTOR USING AN ACOUSTO-OPTICAL CONTROL DEVICE

CROSS-REFERENCE TO RELATED APPLICATIONS

The present application is a continuation of U.S. patent application Ser. No. 14/983,388, filed Dec. 29, 2015, and also claims the benefit of U.S. Provisional Application Ser. No. 62/097,563, filed on Dec. 29, 2014, titled "Acousto-Optical Control Devices for Near-Eye Displays", the content of the aforementioned application is hereby incorporated by reference in its entirety.

BACKGROUND

Modern computing and display technologies have facilitated the development of systems for so-called "virtual reality" or "augmented reality" experiences, wherein digitally reproduced images or portions thereof are presented to a user and may be perceived as real. A virtual reality ("VR") scenario typically involves presentation of digital or virtual image information without transparency to other actual real-world visual input. An augmented reality ("AR") scenario typically involves presentation of digital or virtual image information as an augmentation to visualization of the actual world around the user. For example, referring to FIG. 1, an augmented reality scene 100 is depicted wherein a user of an AR technology device sees a real-world park-like setting 102 featuring people, trees, buildings in the background, and a concrete platform 104. In addition to these items, the user of the AR technology also perceives that he/she "sees" a robot statue 106 standing upon the real-world platform 104, and a cartoon-like avatar character 108 flying by, even though these elements (106, 108) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

Referring to FIG. 2, stereoscopic wearable glasses 200 type configurations have been developed which generally feature two displays (e.g., 202, 204) that are configured to display images with slightly different element presentation such that a three-dimensional perspective is perceived by the human visual system. Such configurations have been found to be uncomfortable for many users due to a mismatch between vergence and accommodation that must be overcome to perceive the images in three dimensions. Indeed, some users are not able to tolerate stereoscopic configurations.

Referring to FIG. 3, a simplified cross-sectional view of a human eye 300 is depicted featuring a cornea 302, iris 304, lens—or "crystalline lens" 306, sclera 308, choroid layer 310, macula 312, retina 314, and optic nerve pathway 316 to the brain. The macula is the center of the retina, which is utilized to see moderate detail. At the center of the macula is the "fovea", which is used for seeing the finest details. The fovea contains more photoreceptors (approximately 120 cones per visual degree) than any other portion of the retina.

The human visual system is not a passive sensor type of system. It is configured to actively scan the environment. In a manner somewhat akin to scanning an image with a flatbed scanner or using a finger to read Braille from a paper, the photoreceptors of the eye fire in response to changes in stimulation, rather than constantly responding to a constant state of stimulation. Indeed, experiments with substances such as cobra venom, which is utilized to paralyze the muscles of the eye, have shown that a human subject will experience blindness if positioned with his/her eyes open, viewing a static scene with venom-induced paralysis of the eyes. In other words, without changes in stimulation, the photoreceptors don't provide input to the brain and blindness is experienced. It is believed that this is at least one reason that the eyes of normal humans have been observed to move back and forth, or dither, in side-to-side motion in what are called "microsaccades". As noted above, the fovea of the retina contains the greatest density of photoreceptors, and while humans typically have the perception that they have high-resolution visualization capabilities throughout their field of view, they generally actually have only a small high-resolution center that they are mechanically sweeping around a lot, along with a persistent memory of the high-resolution information recently captured with the fovea. In a somewhat similar manner, the focal distance control mechanism of the eye (ciliary muscles operatively coupled to the crystalline lens in a manner wherein ciliary relaxation causes taut ciliary connective fibers to flatten out the lens for more distant focal lengths; ciliary contraction causes loose ciliary connective fibers, which allow the lens to assume a more rounded geometry for more close-in focal lengths) dithers back and forth by approximately ¼ to ½ diopter to cyclically induce a small amount of what is called "dioptric blur" on both the close side and far side of the targeted focal length. This is utilized by the accommodation control circuits of the brain as cyclical negative feedback that helps to constantly correct course and keep the retinal image of a fixated object approximately in focus.

The visualization center of the brain also gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR or VR configurations, is known to produce eye fatigue, headaches, or other forms of discomfort in users.

Movement of the head, which houses the eyes, also has a key impact upon visualization of objects. Humans move their heads to visualize the world around them. They often are in a fairly constant state of repositioning and reorienting the head relative to an object of interest. Further, most people prefer to move their heads when their eye gaze needs to move more than about 20 degrees off center to focus on a particular object (i.e., people don't typically like to look at things "from the corner of the eye"). Humans also typically scan or move their heads in relation to sounds—to improve audio signal capture and utilize the geometry of the ears relative to the head. The human visual system gains powerful depth cues from what is called "head motion parallax", which is related to the relative motion of objects at different distances as a function of head motion and eye vergence distance (i.e., if a person moves his head from side to side and maintains fixation on an object, items farther out from that object will move in the same direction as the head; items in front of that object will move opposite the head motion. These are very salient cues for where things are spatially in the environment relative to the person—perhaps as powerful as stereopsis). Head motion also is utilized to look around objects, of course.

Further, head and eye motion are coordinated with the "vestibulo-ocular reflex", which stabilizes image information relative to the retina during head rotations, thus keeping the object image information approximately centered on the retina. In response to a head rotation, the eyes are reflexively and proportionately rotated in the opposite direction to maintain stable fixation on an object. As a result of this compensatory relationship, many humans can read a book while shaking their head back and forth (interestingly, if the book is panned back and forth at the same speed with the head approximately stationary, the same generally is not true—the person is not likely to be able to read the moving book; the vestibulo-ocular reflex is one of head and eye motion coordination, generally not developed for hand motion). This paradigm may be important for augmented reality systems, because head motions of the user may be associated relatively directly with eye motions, and the system preferably will be ready to work with this relationship.

Indeed, given these various relationships, when placing digital content (e.g., 3-D content such as a virtual chandelier object presented to augment a real-world view of a room; or 2-D content such as a planar/flat virtual oil painting object presented to augment a real-world view of a room), design choices may be made to control behavior of the objects. For example, the 2-D oil painting object may be head-centric, in which case the object moves around along with the user's head (e.g., as in a GoogleGlass approach); or the object may be world-centric, in which case it may be presented as though it is part of the real world coordinate system, so that the user may move his head or eyes without moving the position of the object relative to the real world.

Thus when placing virtual content into the augmented reality world, how the content is presented must be given consideration. For example, in a world centric scheme the virtual object stays in position in the real world so that the user may move his/her ahead around it to see the object from different points of view.

The systems and techniques described herein are configured to work with the visual configuration of the typical human to address these challenges.

SUMMARY

In some embodiments, an approach for projecting light may be implemented using a acousto-optical depth switch that uses surface acoustic waves produced along a substrate to guide image light to different areas. The surface acoustic waves may be generated on a substrate using a transducer. Surface acoustic waves of different frequencies can guide image light onto different optical elements at different physical positions. The optical elements may be configured to show objects in an image at different distances from a viewer.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for acousto-optical control devices. Other objects, features, and advantages are described in the detailed description, figures, and claims.

Figure 1:
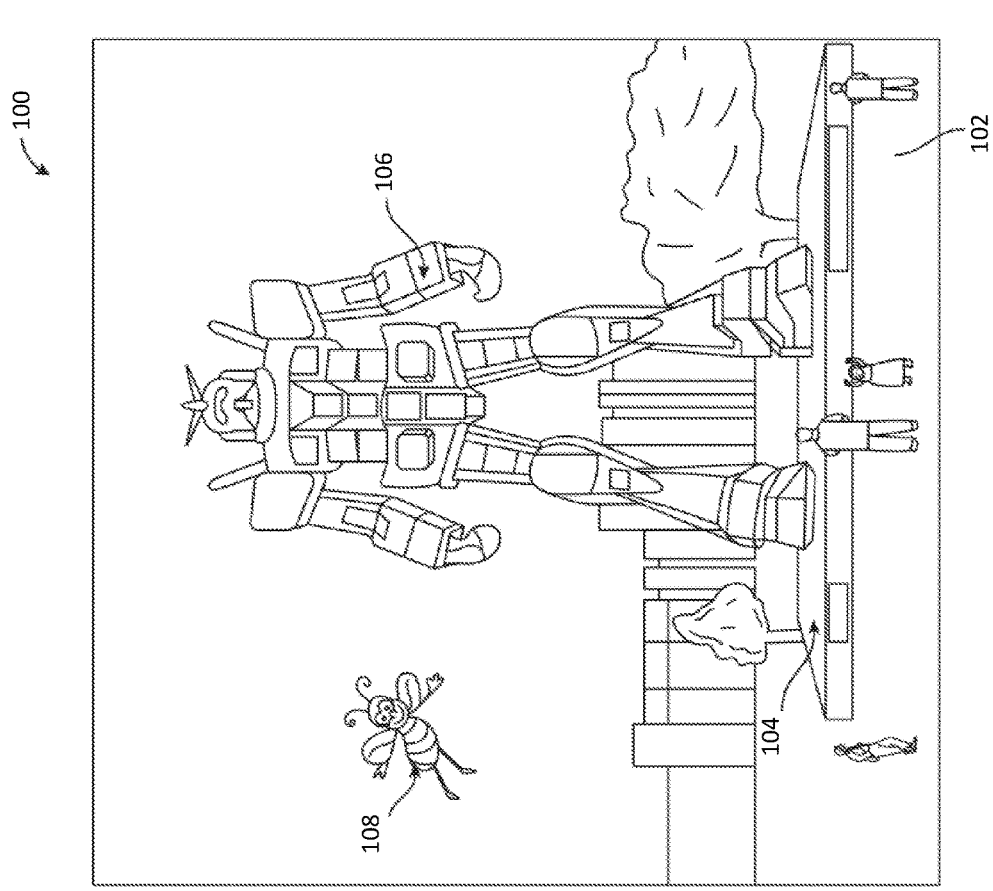
FIG. 1 illustrates an example virtual or augmented reality environment, as according to some embodiments.
Figure 2:
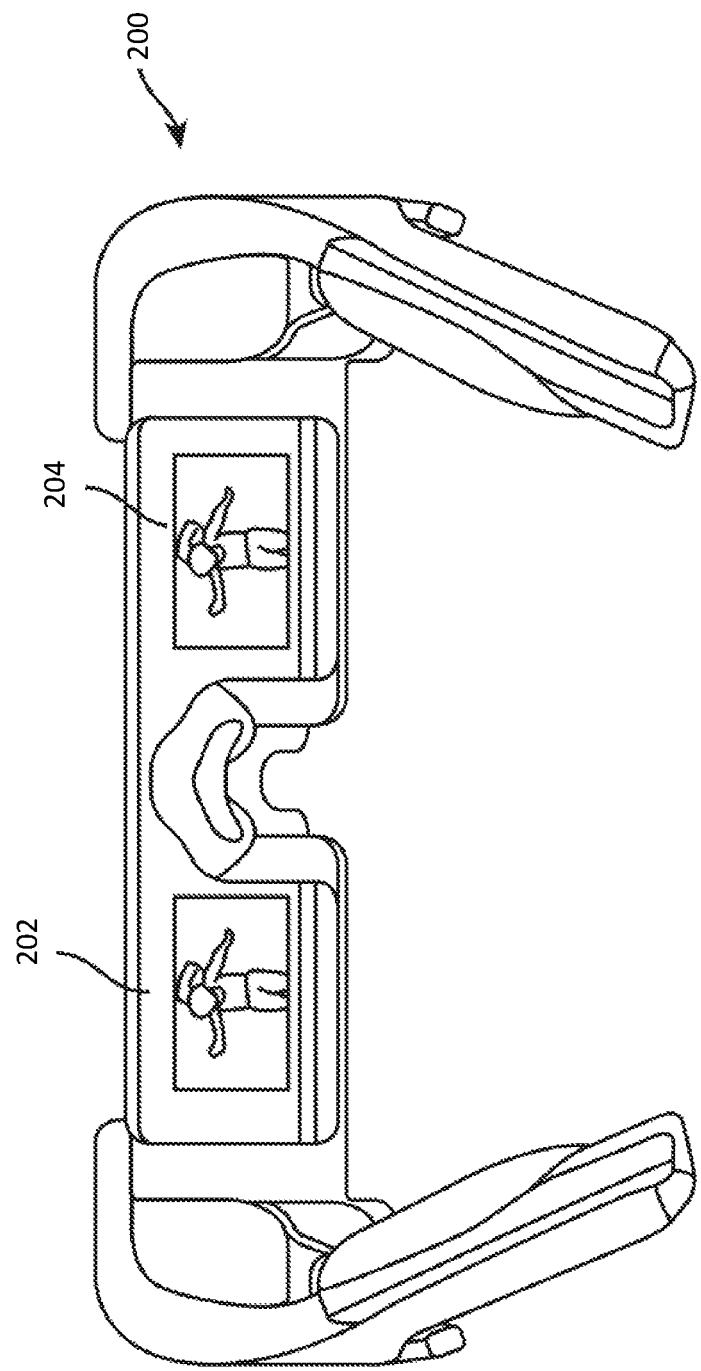
FIG. 2 illustrates a virtual or augmented reality headset, as according to some embodiments.
Figure 3:
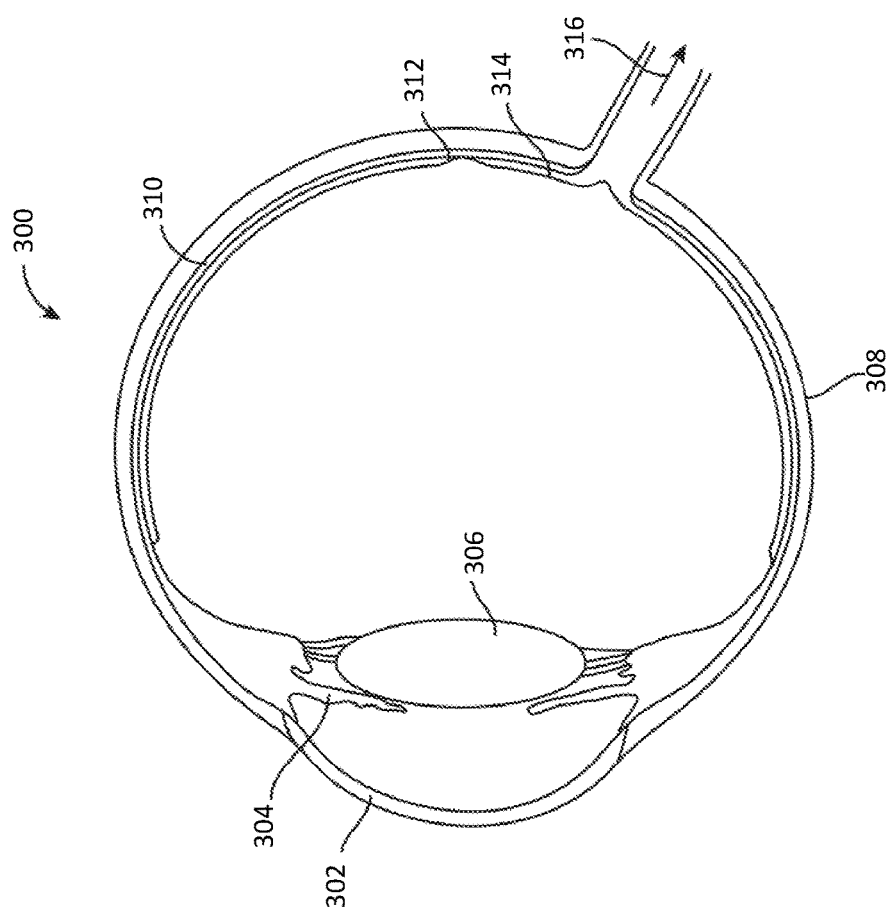
FIG. 3. illustrates components of a human eye.
Figure 4:
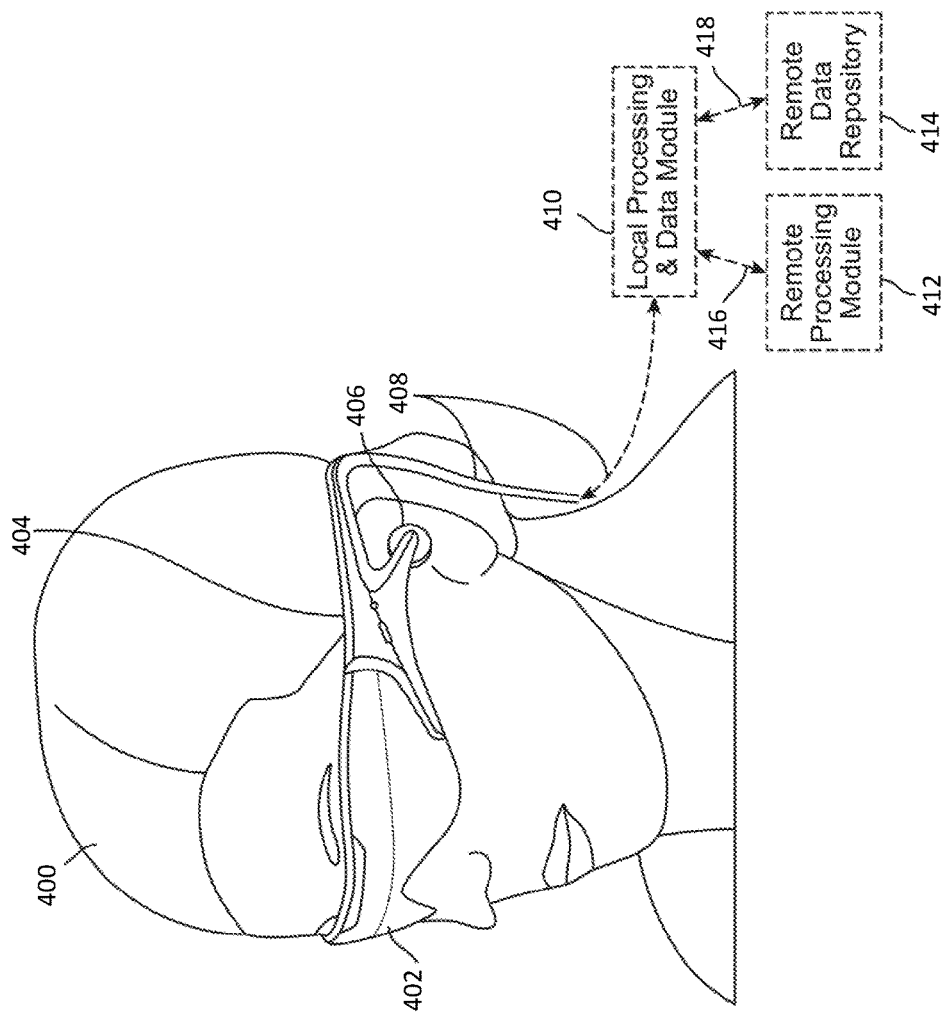
FIG. 4 illustrates a virtual or augmented reality headset and display modules, as according to some embodiments.

Various embodiments of the methods, systems, and articles of manufacture will now be described in detail with reference to the drawings, which are provided as illustrative examples so as to enable those skilled in the art to practice the various embodiments. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration FIG. 4 illustrates an example system and operating environment in which the acousto-optical control devices may be implemented. As shown in FIG. 4, an AR system user 400 is depicted wearing a frame 404 structure coupled to a display system 402 positioned in front of the eyes of the user. A speaker 406 is coupled to the frame 404 in the depicted configuration and positioned adjacent the ear canal of the user (in one embodiment, another speaker, not shown, is positioned adjacent the other ear canal of the user to provide for stereo/shapeable sound control). The display 402 is operatively coupled 408, such as by a wired lead or wireless connectivity, to a local processing and data module 410 which may be mounted in a variety of configurations, such as fixedly attached to the frame 404, according to some embodiments. In additional embodiments, the local processing and data module 410 may be fixedly attached to a helmet or hat, embedded in headphones, removably attached to the torso of the user (in a backpack-style configuration, or removably attached to the hip of the user in a belt-coupling style configuration (not depicted).

The local processing and data module 410 may comprise a power-efficient processor or controller, as well as digital memory, such as flash memory, both of which may be utilized to assist in the processing, caching, and storage of data (a) captured from sensors which may be operatively coupled to the frame 404, such as image capture devices (such as cameras), microphones, inertial measurement units, accelerometers, compasses, GPS units, radio devices, and/or gyros; and/or (b) acquired and/or processed using the remote processing module 412 and/or remote data repository 414, possibly for passage to the display 402 after such processing or retrieval.

The local processing and data module 410 may be operatively coupled (416, 418), such as via a wired or wireless communication links, to the remote processing module 412 and remote data repository 414 such that these remote modules (412, 414) are operatively coupled to each other and available as resources to the local processing and data module 410. In some embodiments, the remote processing module 412 may comprise one or more relatively powerful processors or controllers configured to analyze and process data and/or image information. In some embodiments, the remote data repository 414 may comprise a relatively large-scale digital data storage facility, which may be available through the Internet or other networking configuration in a "cloud" resource configuration. In some embodiments, all data is stored and all computation is performed in the local processing and data module, allowing fully autonomous use from any remote modules.

Figure 5:
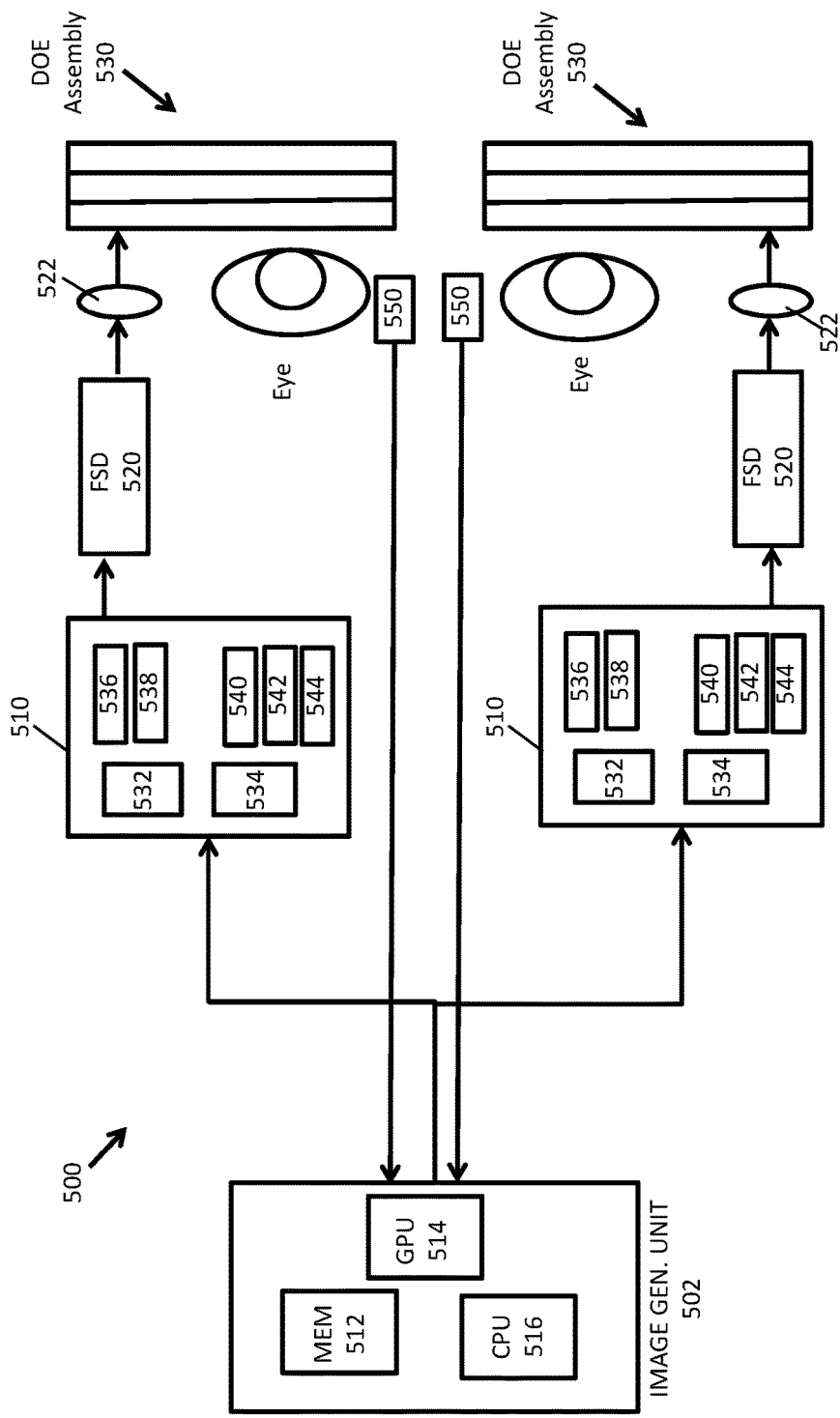
FIG. 5 illustrates an architecture for a virtual or augmented reality headset and display modules using a fiber scanning device, as according to some embodiments.

FIG. 5 illustrates an example AR system that uses stacked waveguide assemblies ("EDGE"), according to some embodiments. The EDGE system 500 generally includes an image generating processor 502, with a memory 512, a CPU 516 and a GPU 514 and other circuitry for image generating and processing. The image generating processor 502 may be programmed with the desired virtual content for presentation to the AR system user. It should be appreciated that in some embodiments, the image generating processor 502 may be housed in the wearable AR system. In other embodiments, the image generating processor and other circuitry may be housed in a belt pack that is coupled to the wearable optics, or other configurations.

The virtual content or information generated by the image generating processor 502 may be transmitted to display circuitry 510. The display circuitry 510 may comprise interface circuitry 532 that may be in communication with the image generation processor 502, and may further interface with circuitry such as chip 534, a temperature sensor 536, a piezoelectric drive/transducer 538, a red laser 540, a blue laser 542, and a green laser 544, and a fiber combiner that combines the lasers (not depicted). Though lasers are illustrated here as an example of a light generator, other types of light generators (e.g., DLP, LCD, LEDs) can also be implemented in display circuitry 510.

The display circuitry 510 may interface with a display or projective device, such as a fiber scanning device (FSD) 520. Generally, an FSD 520 is a display device with one or more optical fibers that are vibrated rapidly to create various patterns to deliver the image. More details about the functioning of FSDs are described in U.S. patent application Ser. No. 14/555,585 filed on Nov. 27, 2014 and entitled "Virtual and augmented reality systems and methods", the content of the aforementioned U.S. patent application is hereby expressly incorporated by reference for all purposes. Although the illustrated embodiment uses an FSD as a display device, one of ordinary skill in the art appreciates that other display devices known in the art, (e.g. DLP, OLED, LCDs, LCOS) may be similarly implemented.

The AR system may then use a coupling optic 522 to direct light from the FSD to a diffractive optical element (DOE) assembly 530 (e.g., diffractive optical elements). The coupling optics 522, according to some embodiments, may refer to one more lenses that may be used to focus light to different depth planes in the DOE assembly. Briefly, according to some embodiments, a DOE assembly 530 is an apparatus comprised of one or more stacked planar waveguides with diffraction gratings that (1) deflect the image light along the span of the waveguide, (2) allow the image light to exit the waveguide at angles that mimic natural real-world diffractive effects. Each DOE layer may be customized to a specific focus depth, as described in further detail below.

Figure 6:
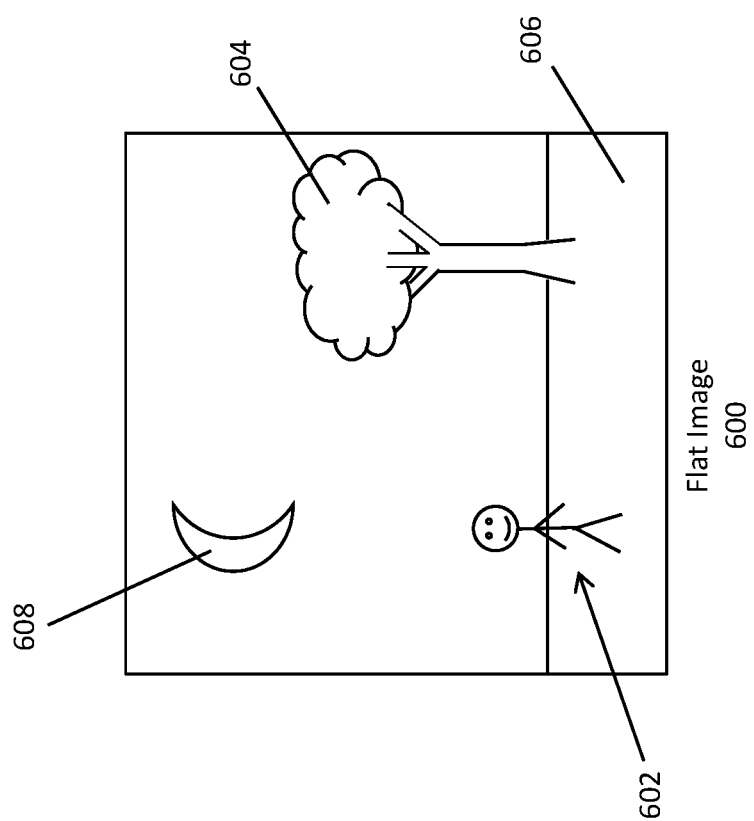
FIG. 6 illustrates an example of a virtual or augmented reality environment as a flat image, as according to some embodiments.

FIG. 6 shows an illustrative example of a scene with objects at different distances shown in the same depth plane. There, a flat image 600 shows a man 602, a tree 604 which is rooted in the ground 606, and a moon 608 in the sky. In the real world, light diffracts or spreads out as it travels. Thus, light reflected from far away objects, such as the moon 608, has spread out more than light reflected from closer objects, such as the man 602. As explained above, the human vision system handles light coming from far and near objects in at least two ways (1) by line of sight adjustments (e.g. vergence movements), and (2) by focusing. For instance, when viewing the moon in the real world, the eyes adjust by converging each eye's line of sight to cross where the moon is located. Similarly, if one stares at the tip of his/her own nose, the eyes will again adjust converging each eye's line of sight to cross where the tip of the nose is located and the subject will outwardly appear "cross-eyed".

In addition to adjusting lines of sight, each eye must focus its lensing system to account for the spreading out of light. For instance, the light reflected from the far-away moon 608 may appear more "blurry" than the light reflected from the man 602 if the light from the moon is not focused. Accordingly, to view the moon, each eye focuses its lens by flattening it out to refract the moonlight less and less, which will eventually bring the moon into focus. Similarly, to view the man each eye focuses its lens by making it more round to increasingly refract the incident light until the man comes into focus. As explained above, adjusting each eye's line of sight and focusing occur together automatically and is known as the "accommodation-vergence reflex."

The issue with conventional/legacy stereoscopic AR or VR configurations is that they work against the accommodation-vergence reflex. For example, referring to the flat image 600 in FIG. 6, if a conventional/legacy stereoscopic AR or VR system displays the moon 608, the tree 604, and the man 602 at different perceived distances (e.g. the man appears closer and the moon appears farther), but all in-focus, then the eyes do not need to refocus when looking at the moon or the man. This causes a mismatch that works against the accommodation-vergence reflex. As mentioned, these sorts of legacy approaches are known to produce eye fatigue, headaches, or other forms of discomfort in users.

Figure 7:
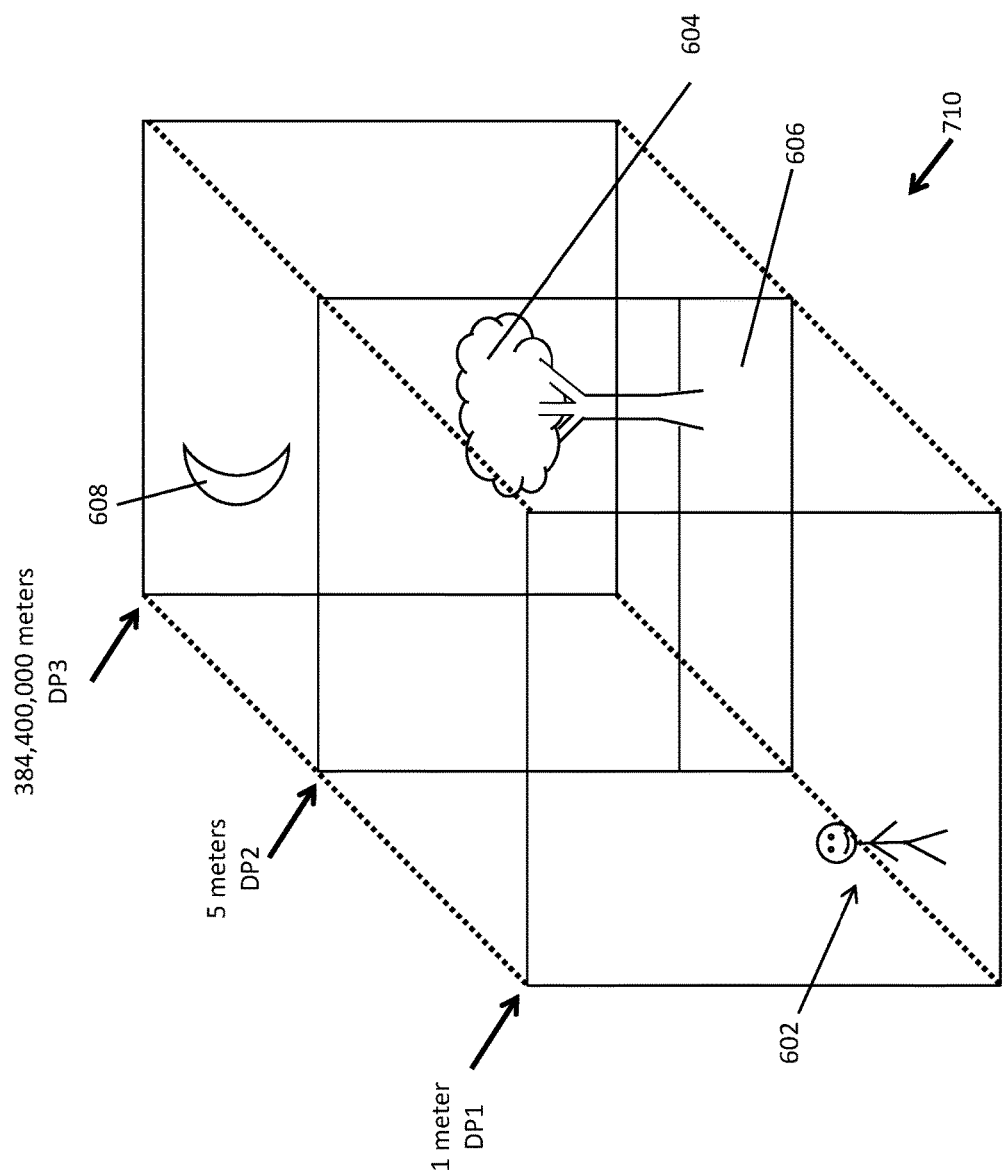
FIG. 7 illustrate an example of the a virtual or augmented reality environment of FIG. 6 split into different depth planes, as according to some embodiments.

In contrast, the DOE assembly 530 (in FIG. 5) works with the human accommodation-vergence reflex by displaying near and far away objects in different depth planes. For example, FIG. 7 shows the same flat image 600 (e.g. the man, the tree, the ground, and the moon) broken up into three depth planes, DP1, DP2, DP3, to form a depth composite image 710. The object that is intended to be closest, the man 620, is displayed in depth plane 1 (DP1), which has been tuned to mimic light spreading out from objects 1 meter away. The middle objects, the tree 604 and the ground 606, are displayed in depth plane 2 (DP2), which has been tuned to mimic light spreading out from objects 5 meters away. Finally, the farthest object, the moon 608, is displayed in depth plane 3 (DP3), which has been tuned to mimic light spreading out from objects 384,400,000 meters away. (384,400,000 meters is the approximate distance from the Earth to the Moon. However, for objects past a certain distance it is common to simply adjust the imaging system, such as a lensing system, to optical infinity, whereby the incident light rays are approximated as nearly parallel light rays.) In this way, a viewer of the depth-composite image 710 must adjust both his/her focusing and line of sight convergence when looking at the objects in the different depth planes, and no headaches or discomfort will occur.

Referring again to FIG. 5, the image generating processor 502 may be implemented as the device that "breaks-up" a flat image into a number of objects in a number of depth planes, according to some embodiments. In other embodiments, the image sequence is stored as separate depth plane specific image sequences, and the image processing generator transmits the pre-processed depth plane image sequences to the display circuitry ready for display.

In some embodiments, the DOEs are switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light). More details about the volume phase holograms are described in U.S. patent application Ser. No. 14/555,585 filed on Nov. 27, 2014 and entitled "Virtual and augmented reality systems and methods", the content of the aforementioned U.S. patent application is hereby expressly incorporated by reference for all purposes.

To conserve resources, such as battery power, in some embodiments it may be preferable to only display image information for a certain depth plane when the viewer is looking at objects in the depth plane. For instance, referring to FIG. 7, if the image consists only of the moon 608, then DP3 may be switched on, while the others depth planes, DP1 and DP2 switched off. Optionally, all three depth planes may be turned on and used to display objects in a sequenced fashion. For example, the FSD 520 may quickly switch between projecting images on DP1, DP2, DP3 in rapid succession. Because the human vision system can only detect movements/changes up to a certain frequency (e.g. 30 Hz), the viewer will not perceive that the FSD 520 is switching between planes but will instead perceive a smooth multi-depth planed composite image stream.

Additionally, according to some embodiments, the system may also include an eye-tracking subsystem 550 (FIG. 5). In this case, the eye-tracking subsystem can monitor the viewer's eye's (for instance by monitoring the eye's convergence angles) to determine whether the viewer is looking at a far object or a close object. If the system detects that the viewer is looking at the moon, for instance, then DP3 can be switched on, and DP1 and DP2 switched off and/or attenuated.

A stacked configuration may use dynamic DOEs (rather than static waveguides and lenses) to provide multiplanar focusing simultaneously. For example, with three simultaneous focal planes, a primary focus plane (based upon measured eye accommodation, for example) could be presented to the user, and a + margin and − margin (one focal plane closer, one farther out) could be utilized to provide a large focal range in which the user can accommodate before the planes need be updated. This increased focal range can provide a temporal advantage if the user switches to a closer or farther focus (e.g., as determined by accommodation measurement). Then the new plane of focus could be made to be the middle depth of focus, with the + and − margins again ready for a fast switchover to either one while the system catches up.

However, this scenario assumes that the FSD is able to operate fast enough to rapidly generate different images/portions of the images to be injected into multiple DOEs. As explained, FSDs generally work by rastering back and forth over a given angle. The angle dictates the field of view (FOV) for the image that is displayed. In a system with six depth planes (e.g. DP1, DP2 . . . DP6), the FSD must be able to switch between depth planes six times per frame in a seamless manner. For example, if the frames per second (FPS) is 60 (typical in many video stream implementations), then for each frame the FSD must switch six times per frame. Additionally, in each depth plane there may be two target zones, one for green light and a second one for red and blue light. Accordingly, there may be 12 targets per frame that the FSD must be able to switch to. Thus, for 60 FPS and 12 targets the FSD must be able to switch approximately 714 times per second to raster a seamless image/video sequence. Because a FSD is a physical/mechanical device that actuates a fiber through an angle to raster images, it becomes increasingly difficult to actuate over larger angles fast enough, as the frames per second or number of depth planes increases.

Additionally, assuming FSD 520 can raster and switch fast enough, the coupling optics 522 (which direct light received from the FSD into the DOE assembly at nearly orthogonal angles) should be capable of matching the speed and FOV requirements of the FSD. Current approaches, such as using lenses to focus FSD light onto each depth plane, are limited at least with respect to the FOV requirements. Ideally, for realistic simulations, an FOV of 120 degrees is required to mimic natural real-world vision. However, current coupling optic approaches, such as using a variable focus lensing system, LC shutters, and/or grating systems, cannot product 120 degrees FOV, and cannot switch between depth planes fast enough to produce a seamless visual display.

Additionally, mechanically actuating an FSD and coupling optics, such as a lensing system, can drain power and resources, even if such approaches could switch fast enough over the required FOV. Thus, there is a need for an approach for quickly displaying images in multiple depth planes over a large field of view.

Figure 8:
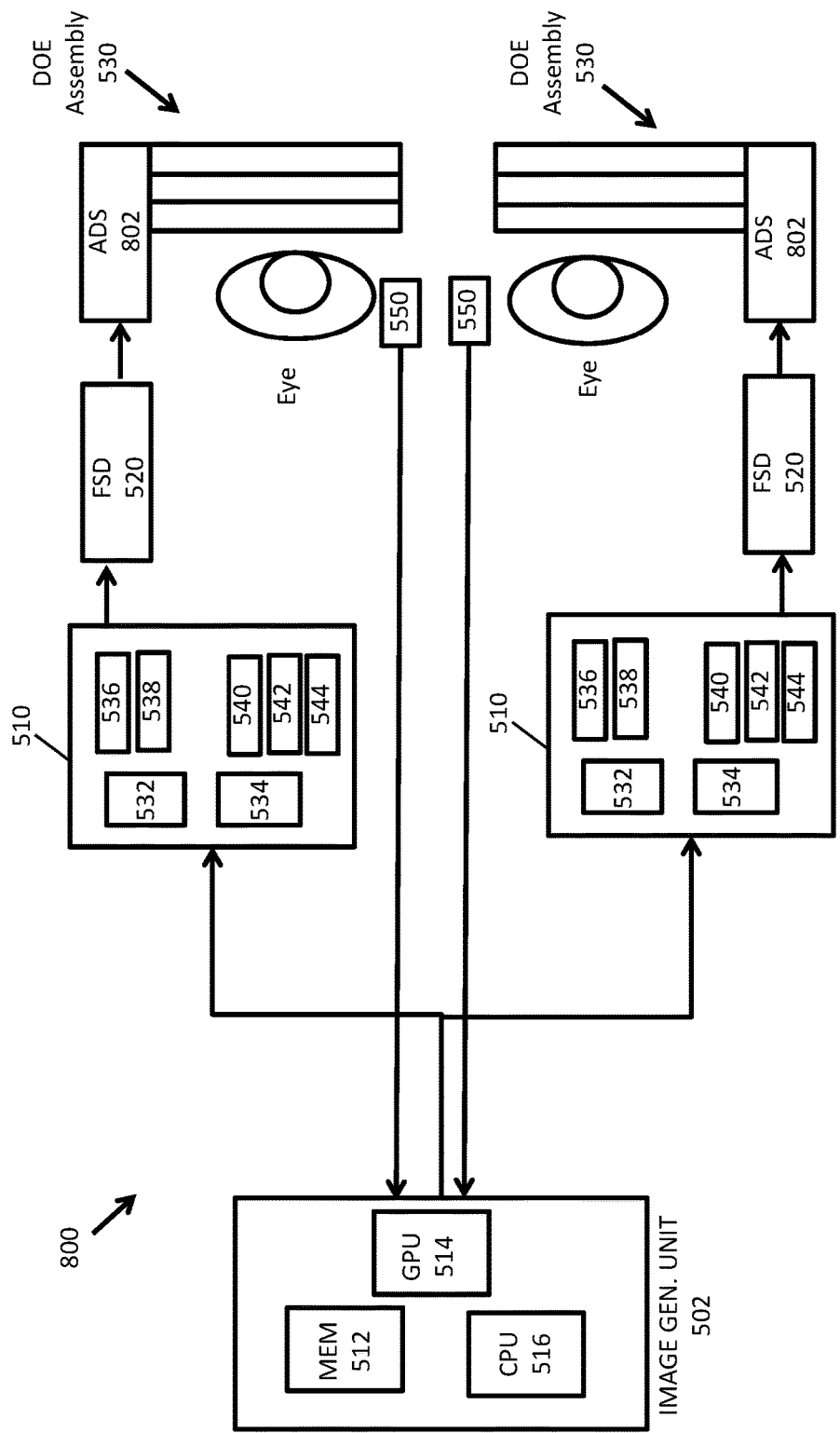
FIG. 8 illustrates an architecture for a virtual or augmented reality headset and display modules using a fiber scanning device and an acousto-optical depth switch, as according to some embodiments.

FIG. 8 illustrates an approach for quickly displaying images in multiple depth planes over a large field of view. There, the architecture 800 is similar to the architecture illustrated in FIG. 5, with exception to the acousto-optical depth switch (ADS) 802 that is capable of matching and/or exceeding the FSD's speed over a large FOV, such as 120 degrees. As illustrated in the example embodiment of FIG. 8, the ADS 802 is coupled to receive light from the FSD 520 and focus the light onto different DOE layers that are at different depths.

Figure 9:
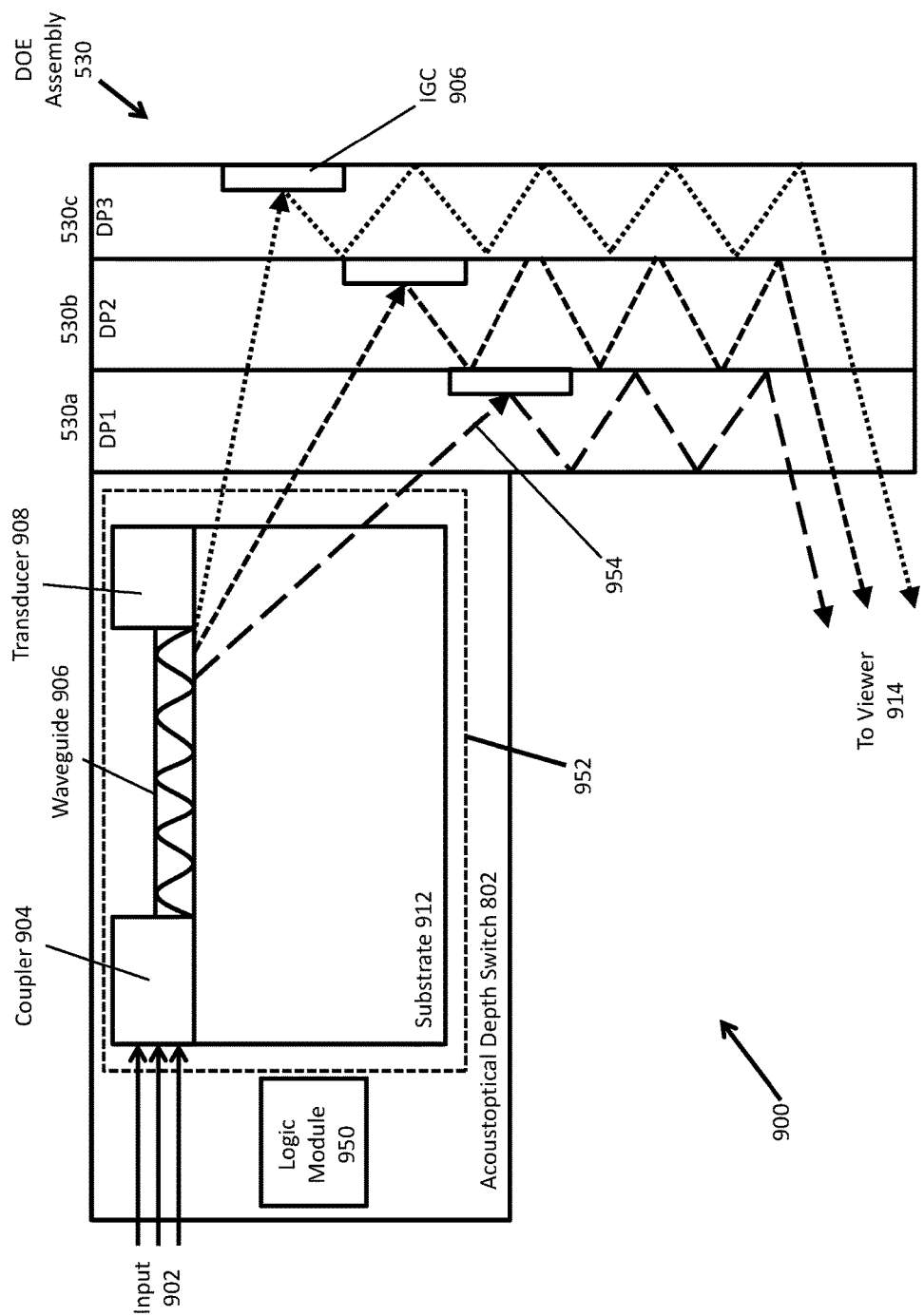
FIG. 9 illustrates internal architecture of the acousto-optical depth switch and a diffractive optical assembly, as according to some embodiments.

FIG. 9 illustrates internal architecture 900 showing aspects of the ADS and the DOE assembly, as according to some embodiments. There, the ADS 802 includes a logic module 950 and an acousto-optical (AO) modulator 952. In the embodiment illustrated, the light input 902 from the FSD 520 enters the ADS 802 unit and is deflected (e.g. diffracted, refracted) at a number of angles into the the DOE assembly 530. Each DOE layer or diffractive element (e.g. 530*a*, 530*b*, 530*c*) corresponds to a depth plane (e.g. DP1, DP2, DP3). For example, DOE layer 530*a* may correspond to DP1, and displays the man 620 (FIG. 7) at a perceived distance of 1 meter away from the viewer. Likewise, DOE layer 530*b* may correspond to DP2, and displays the tree 604 rooted in the ground 606 at a perceived distance of 5 meters away from the viewer. Finally, DOE layer 530*c* may correspond to DP3, and displays the moon 608 at a perceived distance of 384,400,000 meters away (or at optical infinity).

In some embodiments, each DOE layer implements an in-coupling grating 960 to deflect the image light received form the ADS 802 along the span of the depth plane. The image may then exit the DOE layers towards the viewer 914 using a second set of diffraction gratings (not depicted).

More details about the gratings are described in U.S. patent application Ser. No. 14/555,585, filed on Nov. 27, 2014 and entitled "Virtual and augmented reality systems and methods", as well as U.S. patent application Ser. No. 14/726,424, filed on May 29, 2015 and entitled "Methods and systems for virtual and augmented reality". The content of the aforementioned U.S. patent application is hereby expressly incorporated by reference for all purposes.

In some embodiments, the AO modulator receives the light through a coupling optic, guides the received light along a waveguide, uses a transducer to cause surface acoustic waves along a substrate (the surface acoustic waves change the index of refraction of the substrate), which causes the light to exit the substrate at an angle proportional to the surface acoustic wave period. In particular, as illustrated in FIG. 9, the input light 902 first interfaces with the AO modulator 952 through a coupler 904, such as a prism. The coupler 904 directs the light into a waveguide 906 on a substrate 912. In some embodiments, the substrate comprises a piezoelectric material such as quartz, or other piezoelectric transparent/translucent materials as are known in the art. In some embodiments, the substrate comprises a thin sheet of lithium niobate, which is also piezoelectric (i.e., generates electricity in response to pressure/stress).

In some embodiments, the lithium niobate substrate may be used as an electro-optical switch by applying high voltages (e.g. 30 volts) to change the index of refraction of the material and refract light in desired directions. However, running high voltages near the human face is typically not desired. Further, using high voltage switches, such as a 30-volt lithium niobate switch, may not be practical in wearable computer-vision systems where battery power is typically limited.

Alternatively, as illustrated in FIG. 9, instead of using the substrate as an electro-optical switch, the AO modulator uses the substrate 912 as an acousto-optical switch. For example, a transducer 908 may be supplied with very low voltages that causes the substrate to jiggle back and forth to produce waves along the surface of the substrate (e.g. "surface acoustic waves"). The surface acoustic waves may have a certain defined period (e.g. the distance from peak-to-peak) that is proportional to the frequency of waves produced by the transducer. That is, for example, if the transducer 908 receives 60 Hz AC, the period of the surface acoustic waves approximately matches 60 Hz (discounting, for example, the energy lost in the material itself, e.g., hysteresis). Likewise, if RF frequency power is supplied to the transducer, the surface acoustic waves will approximately match the RF frequencies. Thus, by changing the frequency of the transducer, the period of the induced surface waves can be controlled and/or tuned. Generally, in some embodiments, the logic module 950 may manage the AO modulator 952 to produce the required frequencies. For example, the logic module may receive a stream of data causes the transducer to change frequencies in a sequence to direct light to the DOE assemble layers. In other embodiments, other components, such as the image processing generator 502, manage the AO modulator to produce the sequences of frequencies.

As mentioned, the surface acoustic waves change the index of refraction of the substrate and may also act as a type of diffraction grating. Initially, the waveguide and the substrate have two different indices of refraction, such that total internal reflection occurs for light inside the waveguide. Certain substrates, such as lithium niobate, have an index of refraction that changes in response to electrical energy or physical/mechanical energy (e.g. stresses). As such, by applying different surface acoustic waves to a lithium niobate substrate, the index refraction can be changed so as to breakdown the total internal reflection occurring within the waveguide and thus allow the light inside the waveguide to escape.

Further, the angle at which light of a given wavelength is deflected out of a grating is proportional to the wavelength of the light. For example, shining white light on a grating yields rainbows of "broken-up" colors that correspond to different wavelengths. In some embodiments, the surface acoustic waves act as a diffraction grating that diffracts the image light out of the waveguide/substrate interface (e.g. the interface between 912 and 906 in FIG. 9) at angles proportional to the grating width (e.g. the distance from peak to peak for the surface acoustic wave). In this way, the input light 902 traveling through the waveguide 906 may be deflected by refraction (caused by the change in index of refraction of the substrate 912) and diffraction (caused by the surface acoustic waves inducing a diffraction grating effect proportional to the wave period). The combined effects can be used to guide the input light 902 onto a number of in-coupling grating targets, such as in-coupling grating 906. Additionally, the speed at which light can be deflected from one target to the next can be adjusted by simply applying a different signal (e.g. different frequency) to the transducer 908. In this way, the acousto-optical depth switch 802 can attain very high switching speeds over a large FOV.

Figure 10:
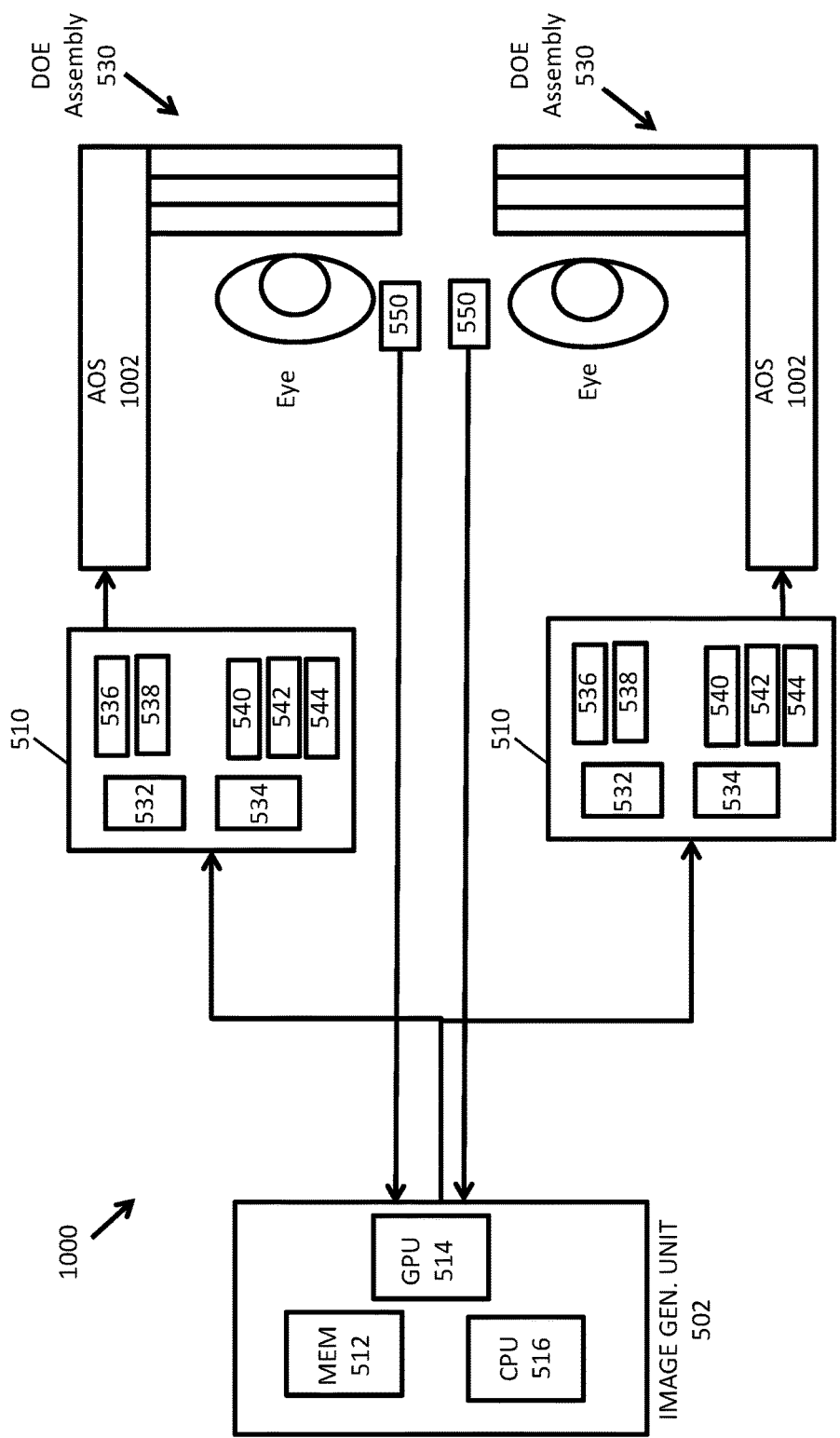
FIG. 10 illustrates an architecture for a virtual or augmented reality headset and display modules using a acousto-optical depth switch directly coupled to display circuitry comprising a light generator, as according to some embodiments.

FIG. 10 illustrates an approach that uses an acousto-optical device as a scanner and switch, without the need for a FSD and/or coupling optic. There, the architecture 1000 is similar to the architecture illustrated in FIG. 8, with exception to the acousto-optical scanner (AOS) 1002 and lack of FSD 520. In operation, image signal from the display circuitry 510 is input directly into the AOS 1002. The AOS 1002 may then modulate and deflect the light onto different depth planes using acousto-optical approaches like those discussed above.

Figure 11:
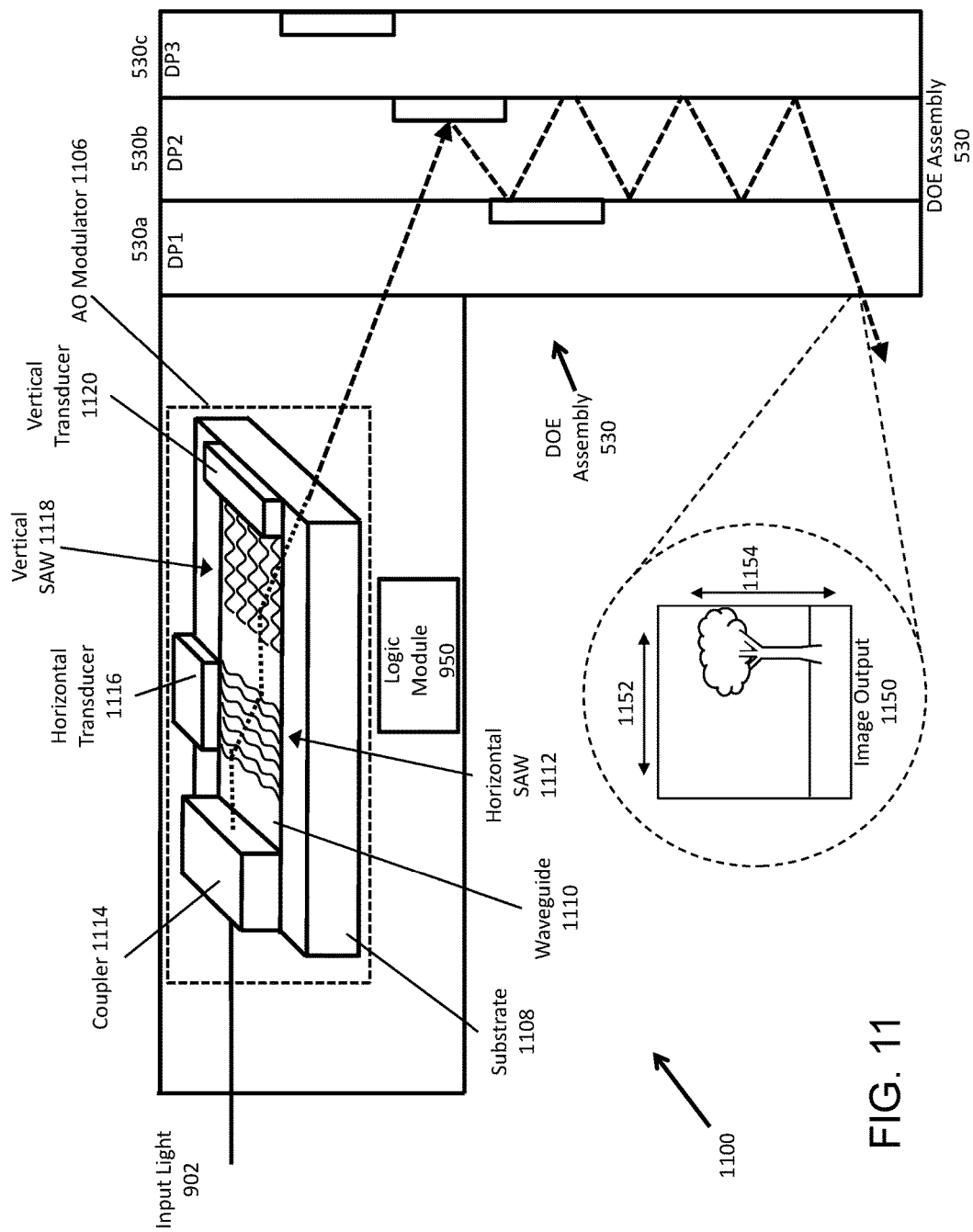
FIG. 11 illustrates internal architecture of a diffractive optical assembly and acousto-optical depth switch having horizontal and vertical transducers, as according to some embodiments.

FIG. 11. illustrates internal architecture 1100 of the acousto-optical scanner (AOS) 1002 and DOE assembly 530, as according to some embodiments. As illustrated, the input light/signal 902 from the display circuit 510 (FIG. 5) may interface first with the coupler 1114, which may be an optical coupler such as a prism. The coupler 1114 directs the light into a waveguide 1110 which uses total internal reflection to guide the light on a substrate 1108. In contrast with the approaches discussed above, the AO modulator 1106 in FIG. 11 has two transducers. The vertical transducer 1120 is discussed above, and generally produces vertical surface acoustic waves 1118 that cause the light to deflect at different angles towards the DOE assembly 530.

The horizontal transducer 1116, in some embodiments, may be aligned orthogonal to the vertical transducer 1120. The horizontal transducer is implemented to produce horizontal surface acoustic waves 1112. Like the vertical surface acoustic waves 1118, which deflect the input light vertically (relative to the AO modulator), the horizontal surface acoustic waves may also deflect light in the waveguide but horizontally, using mechanisms such as Bragg diffraction. Thus as implemented, the AO modulator 1106 can control the input light in both the horizontal and vertical directions. For example, with reference to image output 1150, in DP2 the image to be displayed is the tree rooted in the ground. To direct the beam to scan the image horizontally 1152, the horizontal transducer can modulate the horizontal surface acoustic waves by controlling the frequency and thus the horizontal deflection of the light. Likewise, to scan the image output vertically 1154, the vertical transducer 1120 can modulate the vertical surface acoustic waves 1118 by controlling the frequency and thus the vertical deflection of light.

Figure 12:
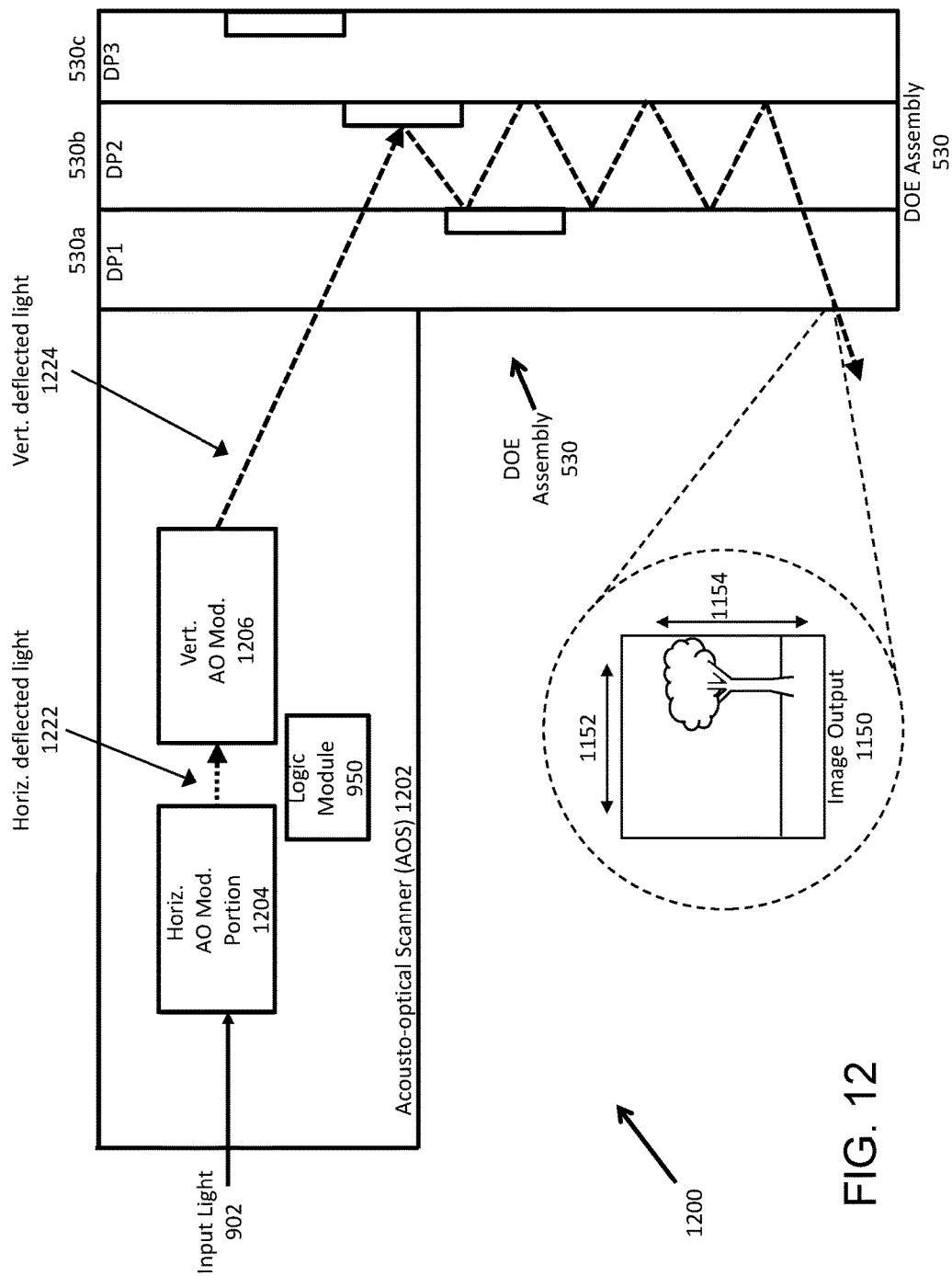
FIG. 12 illustrates internal architecture of a diffractive optical assembly and a horizontal orientated acousto-optical depth switch coupled to a vertical oriented acousto-optical depth switch, as according to some embodiments.

FIG. 12 shows an AOS architecture 1200 for deflecting the light using a horizontal AO modulator and a vertical AO modulator in a hybrid AOS unit 1202, as according to some embodiments. There, the horizontal AO modulator 1204 may comprise the coupler, substrate, waveguide, and a horizontal transducer (e.g., horizontal transducer 1116), which may be used to produce horizontally deflected or shifted light 1222. The horizontally deflected light may then be input into the vertical AO modulator 1206. The vertical AO modulator may comprise a coupler, substrate, waveguide and a vertical transducer (e.g., vertical transducer 1120) which produces vertical surface acoustic waves that deflect the light vertically 1224. Thus instead of one combined vertical/horizontal AO modulator (e.g., 1106 in FIG. 11), the two modulators (1204, 1206) are individual units and each may have their own substrate, coupler, and waveguide but with orthogonal transducers.

Figure 13:
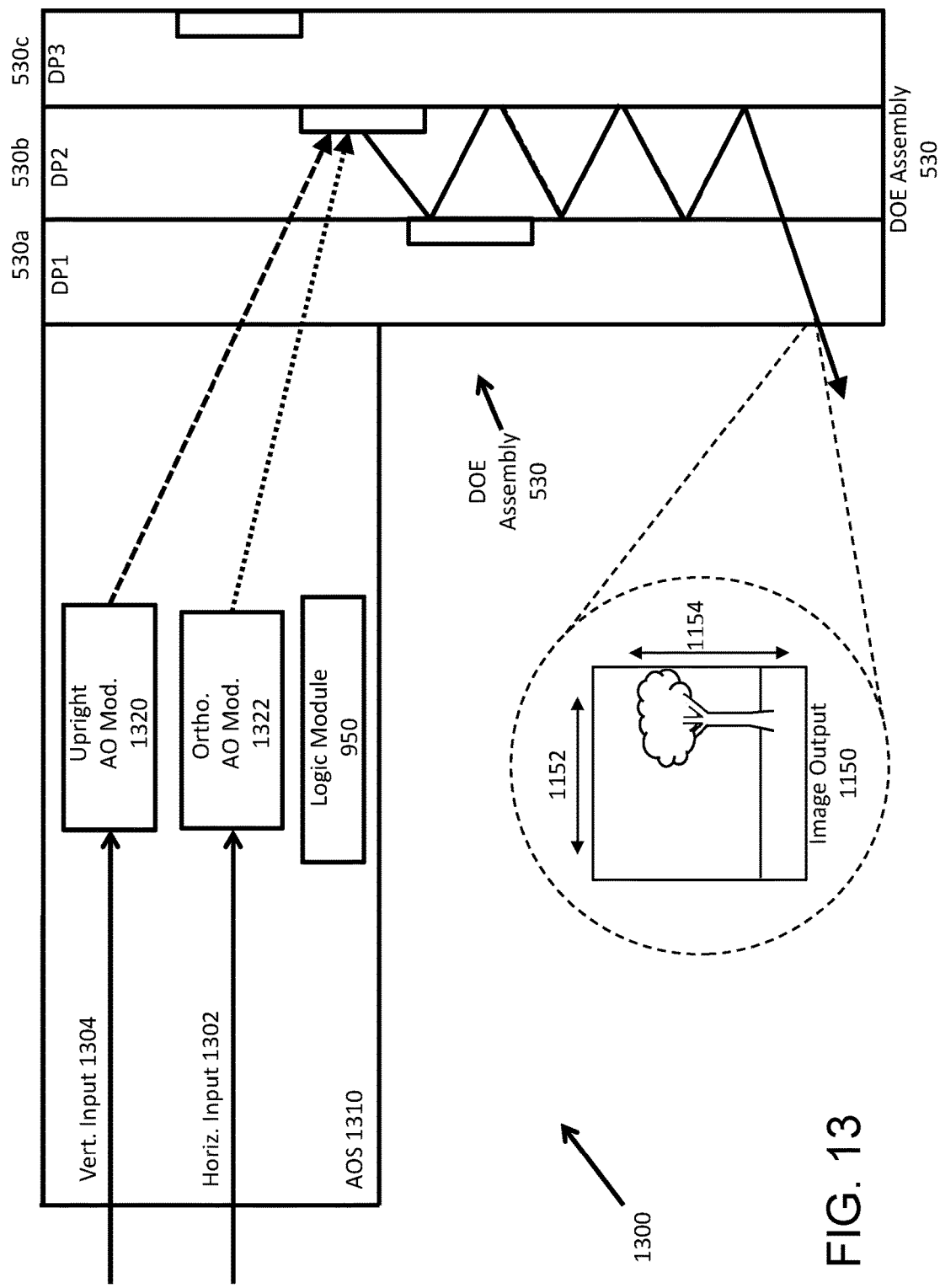
FIG. 13 illustrates internal architecture of a diffractive optical assembly and a horizontal orientated acousto-optical depth switch in parallel to a vertical oriented acousto-optical depth switch, as according to some embodiments.

FIG. 13 shows an AOS architecture 1300 for deflecting the light using an upright modulator and an orthogonal modulator a hybrid AOS unit 1310, as according to some embodiments. There, the upright modulator 1320 is constructed like the AO modulator 952 illustrated in FIG. 9. That is, it is capable of deflecting light in the up/down direction (relative to the modulator). When vertical input light 1304 is input into the upright modulator 1320 it is deflected in the vertical direction to scan an image, such as the image output 1150 in the vertical direction 1154.

The orthogonal AO modulator 1322 is also constructed like the AO modulator 952 illustrated in FIG. 9. However, the orthogonal AO modulator may be rotated 90 degrees so that it is orthogonal to the upright modulator 1320. In this way, the orthogonal AO modulator 1322 deflects horizontal input light 1302 to scan the image in the horizontal direction 1152, without using Bragg diffraction. Though orthogonal modulators are illustrated here as an example, one of ordinary skill in the art appreciates that one or more AO modulators aligned at different angles may similarly be implemented to achieve full image scans. For example, in a three AO modulator implementation, a first AO modulator may be aligned at 0 degrees and input light into a second AO modulator which is oriented at 45 degrees (relative to the first AO modulator) which may input light into a third AO modulator oriented at 90 degrees (relative to the first AO modulator). In this way, the one or more in-between modulators can lessen slowly change the angles instead of going from 0 to 90 degrees in one step.

In some embodiments, it may be preferable to have one substrate, but with two of its orthogonal surfaces utilized. For instance, the top face of the substrate may implement a first coupler, waveguide, and transducer. While on the side face of the substrate, a second coupler, waveguide and transducer is implemented. In operation, this embodiment functions similar to the upright and orthogonal modulators illustrated in FIG. 13 but without the need for a second substrate and/or AO modulator unit.

Figure 14:
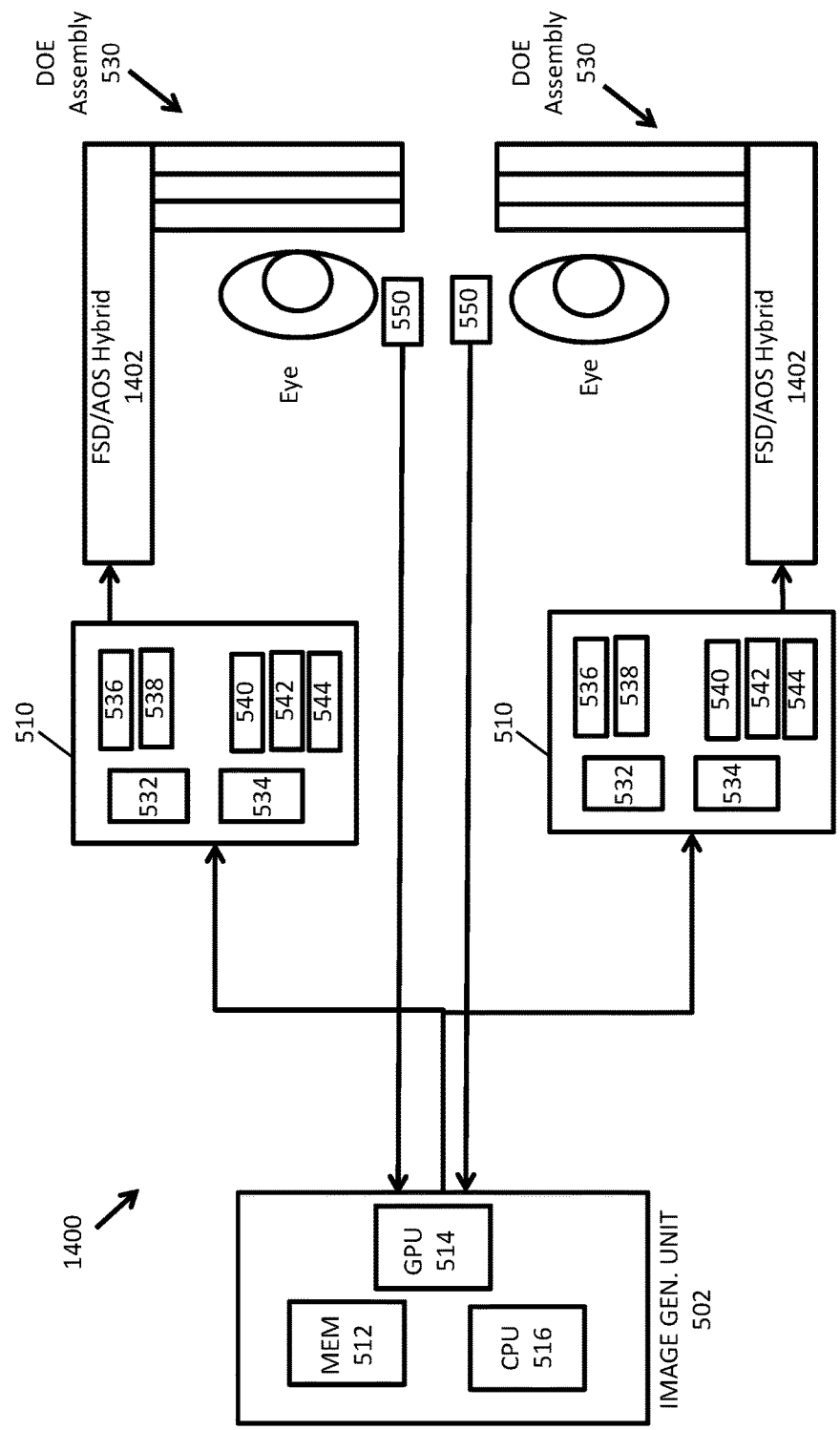
FIG. 14 illustrates internal architecture of a diffractive optical assembly and a hybrid fiber scanning and acousto-optical depth switch device, as according to some embodiments.
Figure 15:
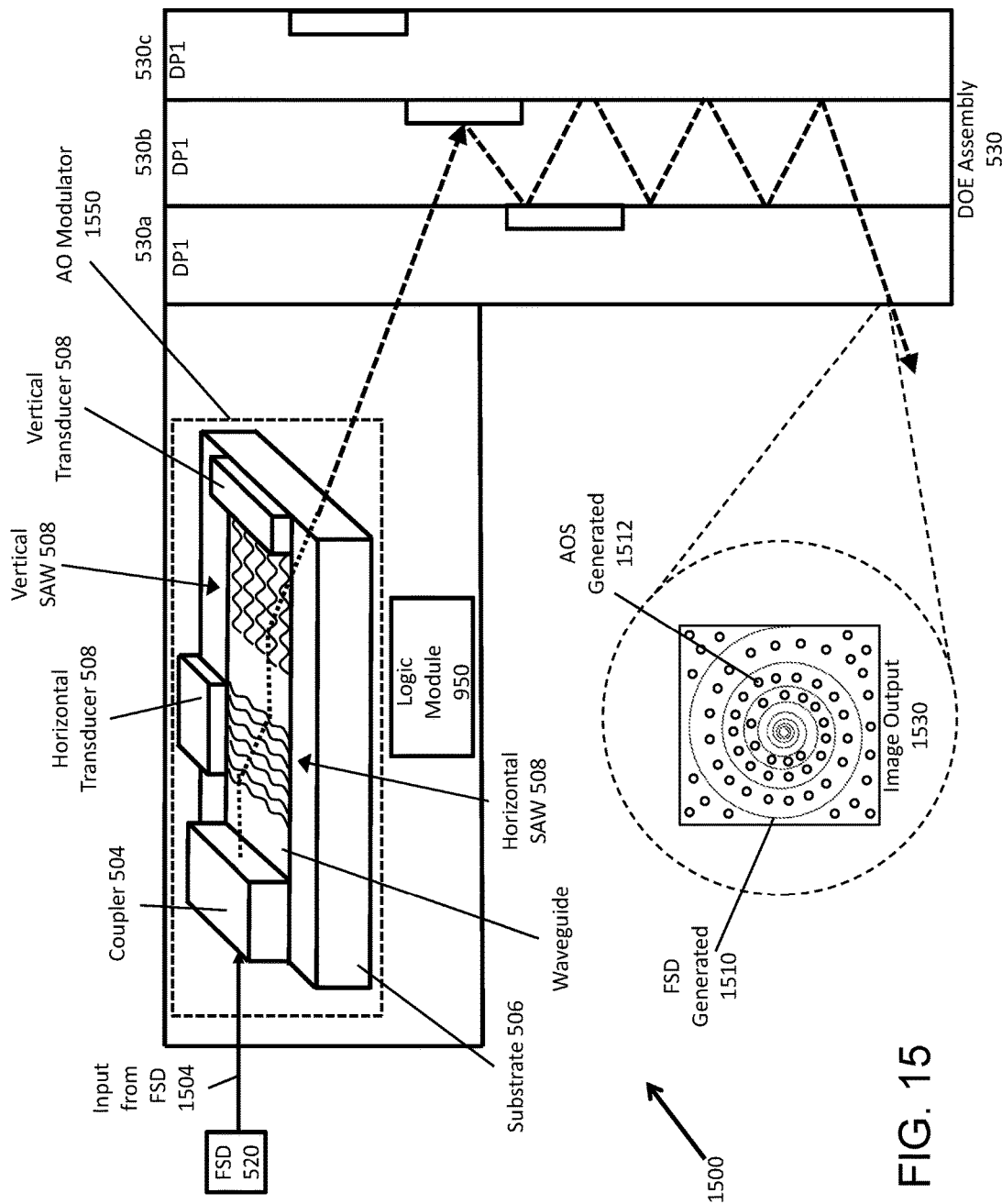
FIG. 15 illustrates internal architecture of a diffractive optical assembly and a acousto-optical depth switch that covers resolutions that the fiber scanning device cannot reach, as according to some embodiments.

FIG. 14 illustrates an architecture 1400 for implementing a hybrid FSD/AOS module, as according to some embodiments. There, the hybrid FSD/AOS module 1402 is structurally similar to the FSD 520 and ADS 802 in FIG. 8. However, in the approach illustrated in FIG. 14, the AOS component is used as a complementary scanner/generator and switch. FIG. 15 shows internal architecture 1500 of the AOS modulator 1550 as according to this embodiment. In this approach, an FSD (e.g., FSD 520) generates an image to be displayed at a certain resolution, the image is input from the FSD as illustrated at 1504. For example, referring to the image output 1530, FSDs generally have a limited resolution and can output light along a swirl at certain spacings. That is, the swirl 1510 in the image output 1530 represents points in which the FSD can project light. The circular points 1512 between the swirl are beyond the resolution of the FSD. However, though the FSD cannot reach the circular points between the swirl, the AO module can. In this approach, the hybrid FSD/AOS component features an AO modulator 1550 with both horizontal and vertical modulators, which can more finely generate image points that the FSD cannot target or reach. As according to some embodiments, the "primary" image points may first be generated by the FSD (e.g. the points along the FSD swirl 1510), whereas the secondary/complementary image points are then generated by the AO modulator 1550 so as to "fill-in" the points that lie beyond the resolution of the FSD.

Figure 16A:
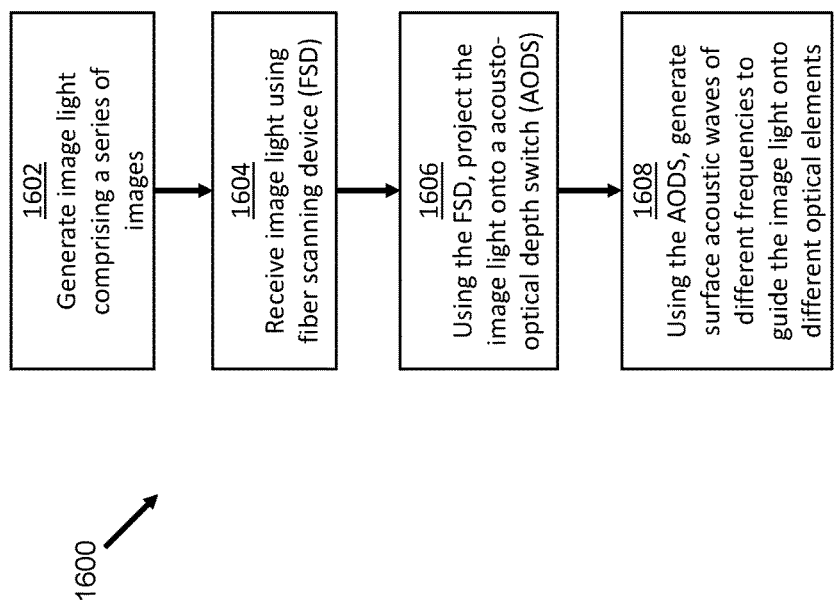
FIG. 16A-16C shows flowcharts for methods for projecting light using an acousto-optical depth switch, as according to some embodiments.

FIG. 16A shows a flowchart 1600 for an approach for projecting light using an acousto-optical depth switch, as according to some embodiments. At 1602, an image generator, such as lasers, LEDs, or an LCD, generates image light comprising a series of images. The series of images may be a video sequence of images, where each image in the series depicts objects at different distances. For example, a first portion of the series could comprise all the objects in a first depth plane which is closed to viewer (e.g., viewer wearing a virtual reality or augmented reality headset). Likewise, other portions of the series may comprise objects at different distances. In an exemplary embodiment, six depth planes are implemented, each of which corresponding to six distances from the viewer. In some embodiments, the first depth plane of six corresponds to a distance of three meters or closer, and the sixth depth plane corresponds to optical infinity or an otherwise very large distance.

At 1604, the image light generated by the light generator is input into an FSD, which actuates over an angle. As according to some embodiments, the FSD is used to project the light onto an acousto-optical depth switch coupling optic as shown at 1606. The coupling optic, such as a prism, may direct the image light onto a wave guide, along a substrate. A transducer within the acousto-optical depth switch may vibrate at different frequencies to generate surface acoustic waves on the surface of the substrate. As explained above, surface acoustic waves of different frequencies deflect the image light at different angles.

At 1608, the transducer may receive instructions from a logic module that instructs the transducer to produce SAWs at different frequencies to deflect the image light onto different optical elements, such as diffractive optical elements.

Figure 16B:
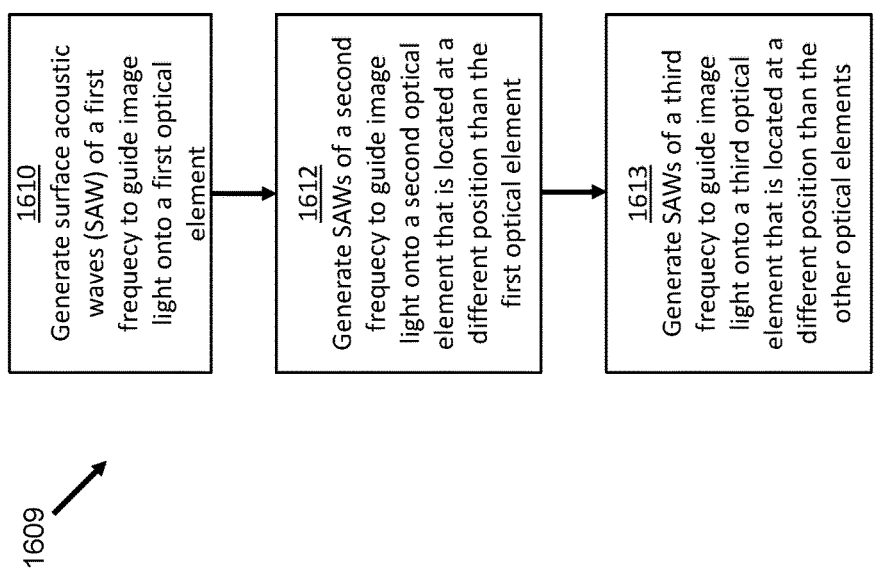

FIG. 16B illustrates a flowchart 1609, for using a acousto-optical depth switch to deflect light at different frequencies, as according to some embodiments. In some embodiments, the image light may be sequences into portions of light for different depth planes. For example, a first leading portion may comprise objects that are to be shown as closest to the viewer. The second portion may comprise objects that to be shown at an intermediate distance to the viewer. A third portion may comprise objects that are to be shown a farthest distance from the viewer. A logic module may direct the transducer to product SAWs of different frequencies in an alternating fashion to deflect the first portion to a first optical element using a first frequency as shown at 1610, a second portion to a second optical element using a second frequency as shown at 1612, and a third portion to a third optical element using a third frequency as shown at 1613. Although only three depth planes and frequencies are discussed here as an example, other numbers of depth planes (e.g., six) and corresponding frequencies can likewise be implemented.

Figure 16C:
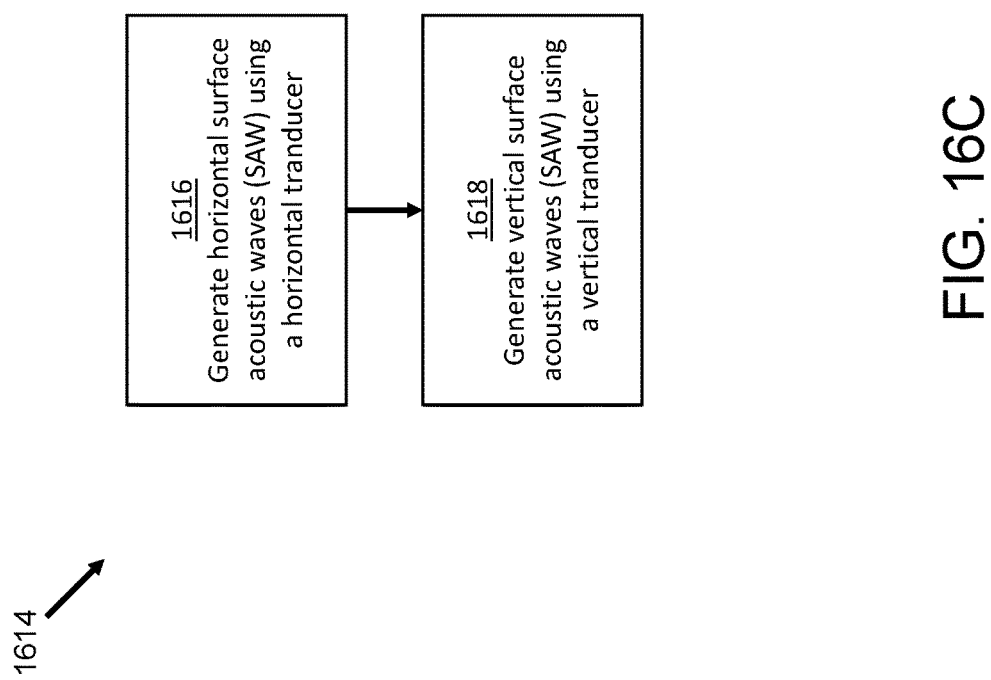

FIG. 16C shows a flowchart 1614 for an approach for projecting light in orthogonal directions using orthogonally oriented transducers, as according to some embodiments. At 1616, horizontal SAWs are generated using a horizontal transducer. The horizontal SAWs can deflect or raster light onto an optical element along a horizontal direction using Bragg diffraction. At 1618, vertical SAWs are generated using a vertical transducer. The vertical SAWs can defect or raster light onto an optical element along a vertical direction using refraction and diffraction.

Figure 17:
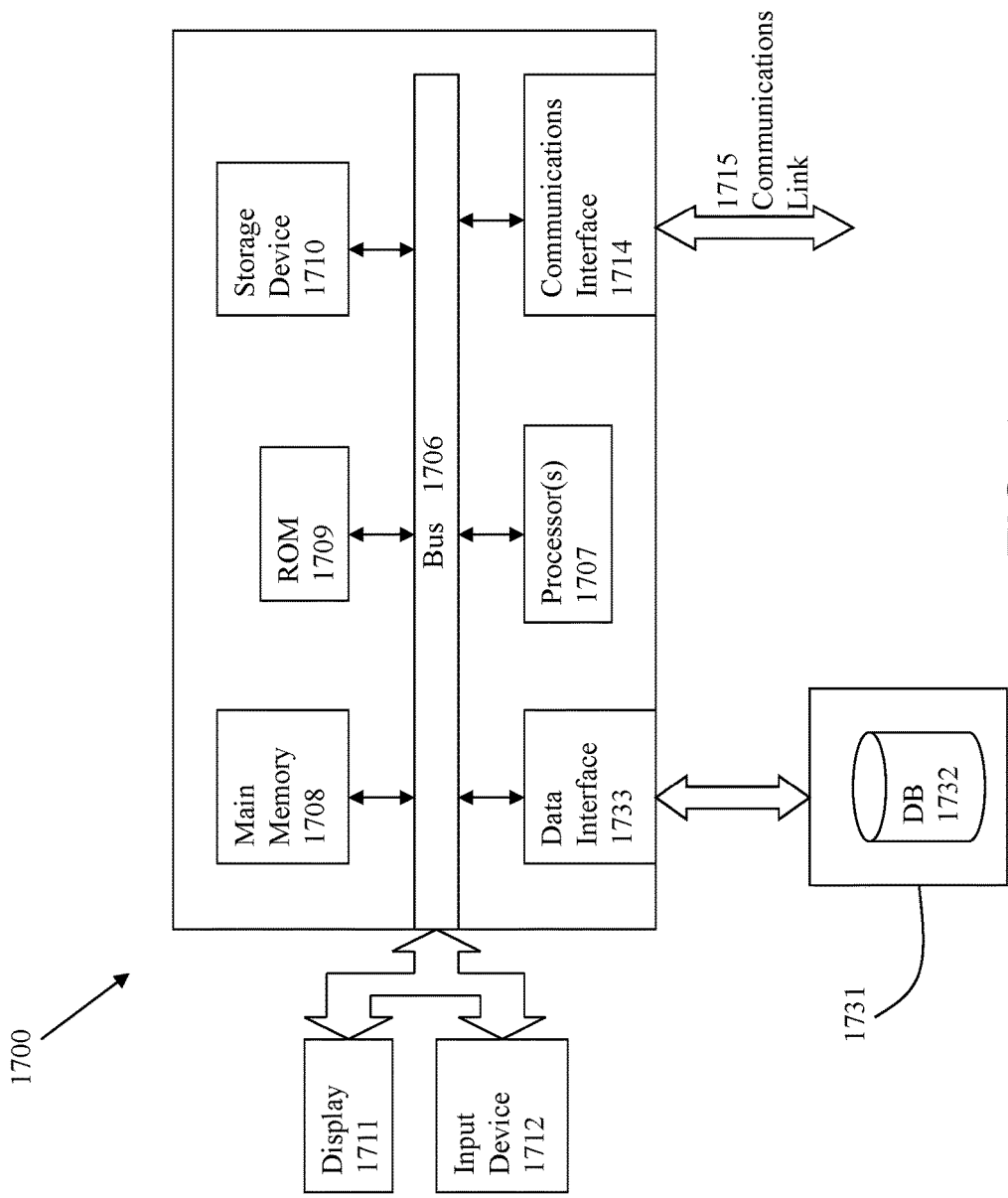
FIG. 17 illustrates example system architecture.

FIG. 17 is a block diagram of an illustrative computing system 1700 suitable for implementing a light projector and the logic module aspects, as according to some embodiments. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the invention, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term tentative embodiments, hard-wired circuitry may be used in place of refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708. According to some embodiments, a database 1732 may be accessed on a computer readable medium 1731 using a data interface 1733"

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1700. According to other embodiments of the invention, two or more computer systems 1700 coupled by communication link 1715 (e.g., LAN, PTSN, or wireless network) may perform the sequence of instructions required to practice the invention in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for projecting light, the system comprising:
a light generator that generates image light that corresponds to a series of images;
a display device configured to receive the image light generated by the light generator and transmit display image light at a first resolution, the display image light comprising a first set of image points; and
an acousto-optical scanner optically coupled to the display device, wherein the display device directs the display image light onto the acousto-optical scanner and the acousto-optical scanner directs portions of the display image light onto a plurality of diffractive optical elements, wherein each of the plurality of diffractive optical elements corresponds to a different depth plane of the series of images;
wherein the acousto-optical scanner is configured to receive the display image light from the display device at the first resolution corresponding to the first set of image points, selectively generate a second set of image points, and output image light at a second resolution greater than the first resolution, the output image light comprising the first set of image points and the second set of image points.

2. The system of claim 1, wherein the display device is further configured to generate the display image light.

3. The system of claim 1, wherein the display device comprises a fiber scanning device.

4. The system of claim 3, wherein the fiber scanning device comprises one or more fibers that actuate over an angle to direct the image light generated by the light generator as the display image light onto the acousto-optical scanner.

5. The system of claim 4, wherein the one or more fibers vibrate rapidly creating patterns to direct the image light generated by the light generator as the display image light onto the acousto-optical scanner.

6. The system of claim 4, wherein the one or more fibers raster back and forth over a given angle.

7. A system for projecting light, the system comprising:
a light generator that generates image light that corresponds to a series of images;
a display device configured to:
receive the image light generated by the light generator, and
transmit display image light comprising a plurality of image points; and
an acousto-optical scanner configured to:
receive the display image light,
in a first mode, direct a first set of image points from the plurality of image points onto a plurality of diffractive optical elements, and
in a second mode, generate a second set of image points from the plurality of image points and direct the second set of image points onto the plurality of diffractive optical elements,
wherein each of the plurality of diffractive optical elements corresponds to a different depth plane of the series of images.

8. The system of claim 1, wherein the display device is further configured to generate the display image light.

9. The system of claim 1, wherein the display device comprises a fiber scanning device.

10. The system of claim 9, wherein the fiber scanning device comprises one or more fibers that actuate over an angle to direct the image light generated by the light generator as the display image light onto the acousto-optical scanner.

11. The system of claim 10, wherein the one or more fibers vibrate rapidly creating patterns to direct the image light generated by the light generator as the display image light onto the acousto-optical scanner.

12. The system of claim 10, wherein the one or more fibers raster back and forth over a given angle.

\* \* \* \* \*